United States Patent
Cho et al.

(10) Patent No.: US 12,218,785 B2
(45) Date of Patent: Feb. 4, 2025

(54) TRANSMITTER USING SYMBOL CONSTELLATION ROTATION AND SPECTRUM SHAPING, TRANSMISSION METHOD THEREOF, RECEIVER AND RECEPTION METHOD THEREOF IN COMMUNICATION SYSTEM

(71) Applicant: Samsung Electronics Co., Ltd., Suwon-si (KR)

(72) Inventors: Joonho Cho, Pohang-si (KR); Jeonghoon Choi, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 18/033,670

(22) PCT Filed: Sep. 1, 2021

(86) PCT No.: PCT/KR2021/011793
§ 371 (c)(1),
(2) Date: Apr. 25, 2023

(87) PCT Pub. No.: WO2022/092538
PCT Pub. Date: May 5, 2022

(65) Prior Publication Data
US 2023/0403185 A1    Dec. 14, 2023

(30) Foreign Application Priority Data

Oct. 26, 2020 (KR) .......... 10-2020-0139615

(51) Int. Cl.
*H04L 25/03* (2006.01)
*H04L 5/00* (2006.01)
(Continued)

(52) U.S. Cl.
CPC ........ *H04L 25/03828* (2013.01); *H04L 5/001* (2013.01); *H04L 27/0008* (2013.01); *H04L 27/2636* (2013.01)

(58) Field of Classification Search
CPC .............. H04L 25/03828; H04L 5/001; H04L 27/0008; H04L 27/2636
See application file for complete search history.

(56) References Cited

U.S. PATENT DOCUMENTS

| 9,967,125 B2 | 5/2018 | Atungsiri |
| 10,027,520 B2 | 7/2018 | Zhu et al. |

(Continued)

FOREIGN PATENT DOCUMENTS

| KR | 10-2011-0076316 A | 7/2011 |
| KR | 10-2016-0091286 A | 8/2016 |

(Continued)

OTHER PUBLICATIONS

Jubum Kim et al., Minimization of PAPR for DFT-Spread OFDM With BPSK Symbols, IEEE Transactions on Vehicular Technology, Oct. 8, 2018.

(Continued)

*Primary Examiner* — Freshteh N Aghdam
(74) *Attorney, Agent, or Firm* — Jefferson IP Law, LLP (57) ABSTRACT

Provided are a discrete Fourier transform (DFT)-spread orthogonal frequency division multiplexing (OFDM) transmitter and transmission method, and a DFT-spread OFDM receiver and reception method which may receive signals transmitted thereby, in which a constellation rotation angle and a frequency domain spectrum shaping vector are designed such that a PAPR may be easily traded off with frequency efficiency even without inter-symbol interference. The DFT-spread OFDM transmitter includes a constellation rotation unit constellation-rotating a symbol vector includ- (Continued)

ing M pulse amplitude modulation (PAM) symbols by a constellation rotation angle to generate a constellation-rotated symbol vector, a pruned DFT-spread unit spreading the constellation-rotated symbol vector by using a pruned DFT matrix to generate a pruned DFT-spread vector, a frequency domain spectrum shaping unit performing a Hadamard product on the pruned DFT-spread vector with a shaping vector to generate a frequency domain spectrum shaped vector, and a subcarrier allocation unit allocating the frequency domain spectrum shaped vector to a subcarrier in an allocated frequency range.

7 Claims, 9 Drawing Sheets

(51) Int. Cl.
*H04L 27/00* (2006.01)
*H04L 27/26* (2006.01)

(56) References Cited

U.S. PATENT DOCUMENTS

| | | | | |
|---|---|---|---|---|
| 2011/0293030 | A1* | 12/2011 | Rakib | H04L 5/0016 375/267 |
| 2017/0134205 | A1 | 5/2017 | Kim et al. | |
| 2018/0054332 | A1 | 2/2018 | Kuchi | |
| 2019/0081840 | A1* | 3/2019 | Park | H04L 27/2636 |
| 2020/0322201 | A1* | 10/2020 | Kuchi | H04L 27/2613 |
| 2023/0188396 | A1* | 6/2023 | Pajukoski | H04L 27/26414 370/329 |

FOREIGN PATENT DOCUMENTS

| | | | |
|---|---|---|---|
| KR | 10-2017-0053076 A | 5/2017 | |
| KR | 10-2020-0058044 A | 5/2020 | |
| WO | WO-2017178871 A1 * | 10/2017 | ....... H04L 25/03834 |
| WO | WO-2018086684 A1 * | 5/2018 | ........... G06F 17/141 |

OTHER PUBLICATIONS

Korean Notice of Allowance dated Jul. 19, 2023, issued in Korean Application No. 10-2021-0116620.
Korean Office Action dated Sep. 18, 2022, issued in a Korean Application No. 10-2021-0116620.
Korean Office Action dated Jan. 25, 2023, issued in a Korean Application No. 10-2021-0116620.

* cited by examiner

ND RECEPTION METHOD THEREOF IN COMMUNICATION SYSTEM

TRANSMITTER USING SYMBOL CONSTELLATION ROTATION AND SPECTRUM SHAPING, TRANSMISSION METHOD THEREOF, RECEIVER AND RECEPTION METHOD THEREOF IN COMMUNICATION SYSTEM

TECHNICAL FIELD

The present disclosure relates to signal transmission and reception using a constellation rotation angle and spectrum shaping, in a communication system.

BACKGROUND ART

In 4G mobile communications, in an uplink, to obtain a low peak-to-average power ratio (PAPR), discrete Fourier transform (DFT)-spread orthogonal frequency-division multiplexing (OFDM), which is a sort of localized single-carrier frequency domain multiple access (SC-FDMA), has been employed. Low PAPR performance provides a wide cell coverage by increasing the efficiency of a power amplifier of user equipment.

Also, in 5G mobile communications, in an uplink, conventional DFT-spread OFDM for low PAPR performance as well as orthogonal frequency division multiple access (OFDMA) has been adopted. In particular, when compared to 4G mobile communications, DFT-spread OFDM employed in 5G mobile communications supports pi/2-binary phase shift keying (BPSK) symbols and frequency domain spectrum shaping to further improve PAPR performance.

However, the use of pi/2-BPSK symbols halves frequency efficiency when compared to conventional QPSK symbols, and as a result, PAPR performance improvement is obtained at the expense of frequency efficiency. That is, the PAPR and the frequency efficiency generally have a trade-off relationship, and in 5G mobile communications, a frequency efficiency value between pi/2-BPSK and QPSK cannot be provided. Therefore, a transmission and reception method is required to appropriately trade off the PAPR with the frequency efficiency.

PRIOR TECHNICAL DOCUMENT

Korean Patent Publication Gazette No. 10-2011-0076316 (2011. Jul. 6)

DISCLOSURE

Technical Problem

The present disclosure provides a discrete Fourier transform (DFT)-spread orthogonal frequency division multiplexing (OFDM) transmitter and transmission method, and a DFT-spread OFDM receiver and reception method which may receive signals transmitted thereby, in which a constellation rotation angle and a frequency domain spectrum shaping vector are designed such that a PAPR may be easily traded off with frequency efficiency even without inter-symbol interference.

However, a problem to be solved by the present disclosure is not limited thereto, and may be expanded in various ways without departing from the spirit and scope of the present disclosure.

Technical Solution

A discrete Fourier transform (DFT)-spread orthogonal frequency division multiplexing (OFDM) transmitter according to an embodiment of the present disclosure includes a constellation rotation unit constellation-rotating a symbol vector b including M pulse amplitude modulation (PAM) symbols by a constellation rotation angle $\phi$ to generate a constellation-rotated symbol vector d, a pruned DFT-spread unit spreading the constellation-rotated symbol vector d, by using a pruned DFT matrix $W_{L,M}$ to generate a pruned DFT-spread vector c, a frequency domain spectrum shaping unit performing a Hadamard product on the pruned DFT-spread vector c with a shaping vector s to generate a frequency domain spectrum shaped vector a, and a subcarrier allocation unit allocating the frequency domain spectrum shaped vector a to a subcarrier in an allocated frequency range.

According to an aspect, when M is an even number, the constellation rotation angle $\phi$ may be determined by $$\phi_{proposed} = \mod\left\{\frac{(L-1)\pi}{M} + \frac{\pi}{2}, \pi\right\},$$

in which L is a number of subcarriers to be used.

According to an aspect, when M is an odd number, the constellation rotation angle $\phi$ may be determined by $$\phi_{proposed} = \mod\left\{\frac{(L-1/2)\pi}{M} + \frac{\pi}{2}, \pi\right\},$$

in which L is a number of subcarriers to be used.

According to an aspect, an element (i, j) of the pruned DFT matrix $W_{L,M}$ may be determined by $$[W_{L,M}]_{(i,j)} = \frac{1}{\sqrt{M}} e^{-j\frac{2\pi}{M}(i-1)(j-1)},$$

in which indices i and j respectively satisfy $1 \le i \le L$ and $1 \le j \le L$.

According to an aspect, when M is an even number, an lth element of the shaping vector s may be determined by $$s_{proposed,l} \triangleq \begin{cases} \sqrt{2}\sin\left(\frac{\pi\left(l+\frac{1}{2}\right)}{2L-M}\right), & \text{for } 0 \le l \le L - \frac{M}{2} - 1, \\ \sqrt{2}\cos\left(\frac{\pi\left(l-\frac{M}{2}+\frac{1}{2}\right)}{2L-M}\right), & \text{for } \frac{M}{2} \le l \le L-1, \\ \sqrt{2}, & \text{elsewhere} \end{cases}$$

in which $l=0, 1, 2, \ldots, L-1$ and $M/2 \le L \le M$.

According to an aspect, when M is an odd number, an lth element of the shaping vector s may be determined by $$s_{proposed,l} \triangleq \begin{cases} \sqrt{2}\sin\left(\frac{\pi\left(l+\frac{1}{4}\right)}{2L-M}\right), & \text{for } 0 \le l \le L - \frac{M+1}{2}, \\ \sqrt{2}\cos\left(\frac{\pi\left(l-\frac{M}{2}+\frac{1}{4}\right)}{2L-M}\right), & \text{for } \frac{M+1}{2} \le l \le L-1, \\ \sqrt{2}, & \text{elsewhere} \end{cases}$$

in which $l=0, 1, 2, \ldots, L-1$ and $M/2 \le L \le M$.

According to an aspect, the DFT-spread OFDM transmitter may further include an OFDM signal generation unit performing N-point inverse DFT (IDFT) on an output of the subcarrier allocation unit and inserting a cyclic prefix (CP) to generate a signal x.

A discrete Fourier transform (DFT)-spread orthogonal frequency division multiplexing (OFDM) transmission method performed by a DFT-spread OFDM transmitter according to an embodiment of the present disclosure includes constellation-rotating a symbol vector b including M pulse amplitude modulation (PAM) symbols by a constellation rotation angle ϕ to generate a constellation-rotated symbol vector d, spreading the constellation-rotated symbol vector d by using a pruned DFT matrix $W_{L,M}$ to generate a pruned DFT-spread vector c, performing a Hadamard product on the pruned DFT-spread vector c with a shaping vector s to generate a frequency domain spectrum shaped vector a, and allocating the frequency domain spectrum shaped vector a to a subcarrier in an allocated frequency range.

A discrete Fourier transform (DFT)-spread orthogonal frequency division multiplexing (OFDM) receiver according to an embodiment of the present disclosure includes a cyclic prefix (CP) removal unit receiving a signal y passing through a channel, and removing a CP from the signal y to generate a CP-removed vector ỹ, an N-point DFT unit performing N-point DFT on the CP-removed vector ỹ, and cutting out a part corresponding to a subcarrier in an allocated frequency range to generate a vector ã, a frequency domain reception spectrum shaping unit performing a Hadamard product on the vector ã resulting from cutout of the part corresponding to the subcarrier in the allocated frequency range by a conjugate complex vector of a reception shaping vector $s_R$ to generate a frequency domain reception spectrum shaped vector, a pruned IDFT unit multiplying the frequency domain reception spectrum shaped vector by a prefixed pruned DFT matrix $W_{L,M}^H$ to generate a despread vector, an inverse constellation rotation unit inversely constellation-rotating the despread vector by an inverse constellation rotation angle −ϕ to generate an inversely constellation-rotated vector, and an estimation unit taking a real number part of the inversely constellation-rotated vector to generate an estimated value $\widetilde{b}$ of a transmitted pulse amplitude modulation (PAM) symbol vector.

According to an aspect, when the channel is frequency-flat, the reception shaping vector may be the same as a transmission shaping vector.

A discrete Fourier transform (DFT)-spread orthogonal frequency division multiplexing (OFDM) reception method performed by a DFT-spread OFDM receiver according to an embodiment of the present disclosure includes receiving a signal y passing through a channel, and removing a cyclic prefix (CP) from the signal y to generate a CP-removed vector ỹ, performing N-point DFT on the CP-removed vector ỹ and cutting out a part corresponding to a subcarrier in an allocated frequency range to generate a vector ã, performing a Hadamard product on the vector ã resulting from cutout of the part corresponding to the subcarrier in the allocated frequency range by a conjugate complex vector of a reception shaping vector $s_R$ to generate a frequency domain reception spectrum shaped vector, multiplying the frequency domain reception spectrum shaped vector by a prefixed pruned DFT matrix $W_{L,M}^H$ to generate a despread vector, inversely constellation-rotating the despread vector by an inverse constellation rotation angle −ϕ to generate an inversely constellation-rotated vector, and taking a real number part of the inversely constellation-rotated vector to generate an estimated value $\widetilde{b}$ of a transmitted pulse amplitude modulation (PAM) symbol vector.

Advantageous Effects

Disclosed techniques may have effects described below. However, it does not mean that a specific embodiment should include all of the following effects or only the following effects, such that the scope of the disclosed techniques should not be construed as being limited thereto.

With a discrete Fourier transform (DFT)-spread orthogonal frequency division multiplexing (OFDM) transmitter and transmission method, and a DFT-spread OFDM receiver and reception method which may receive signals transmitted thereby according to embodiments of the present disclosure described above, a constellation rotation angle and a frequency domain spectrum shaping vector may be designed such that a peak-to-average power ratio (PAPR) may be easily traded off with frequency efficiency even without inter-symbol interference.

MODE FOR INVENTION

The present disclosure may have various changes thereto and various embodiments, and thus particular embodiments will be illustrated in the drawings and described in detail.

It should be understood, however, that this is not intended to limit the present disclosure to a particular embodiment of the present disclosure, and should be understood to include all changes, equivalents, and alternatives falling within the spirit and scope of the present disclosure.

The terms, first, second, etc., may be used to describe various components, but the components are not limited by these terms. These terms are used to distinguish one component from another component. For example, a first component may be referred to as a second component without departing from the scope of the disclosure, and similarly, the second component may be referred to as the first component.

When an element is referred to as being "connected" or "accessed" to or by any other element, it should be understood that the element may be directly connected or accessed by the other element, but another new element may also be interposed therebetween. Contrarily, when an element is referred to as being "directly connected" or "directly accessed" to or by any other element, it should be understood that there is no new another element therebetween.

The term used herein is used to describe particular embodiments, and is not intended to limit the present disclosure. Singular forms include plural forms unless apparently indicated otherwise contextually. Moreover, it should be understood that the term "include", "have", or the like used herein is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by those of ordinary skill in the art of the disclosure, unless they are defined other. The terms defined in a generally used dictionary should be interpreted as having the same meanings as the contextual meanings of the relevant technology and should not be interpreted as having ideal or exaggerated meanings unless they are clearly defined in the present application.

Hereinafter, with reference to the accompanying drawings, preferred embodiments of the present disclosure will be described clearly and in detail such that those of ordinary skill in the art may easily carry out the present disclosure.

Figure 1:
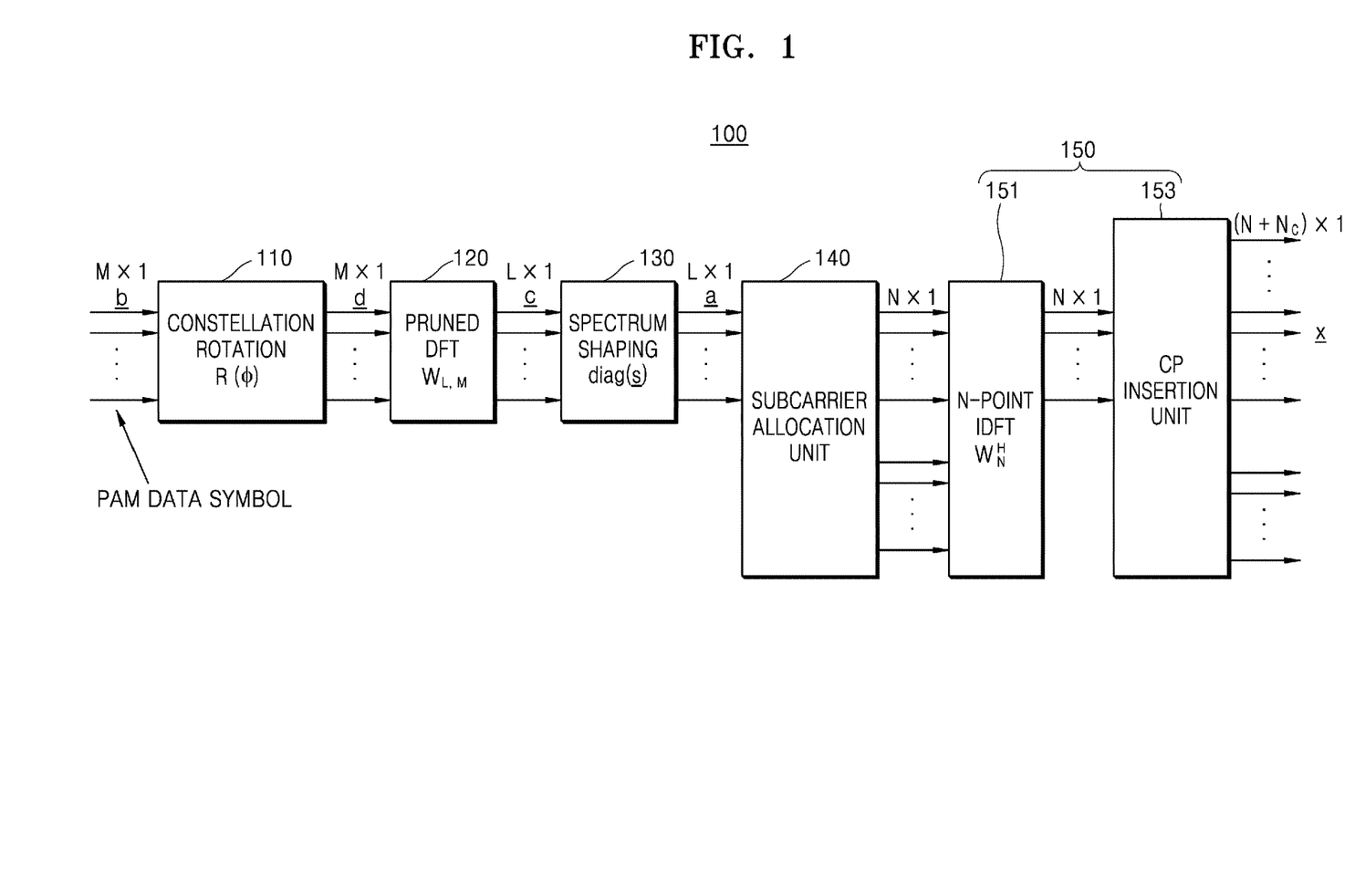
FIG. 1 is a block diagram showing a structure of a discrete Fourier transform (DFT)-spread orthogonal frequency division multiplexing (OFDM) transmitter, according to an embodiment of the present disclosure.
Figure 2:
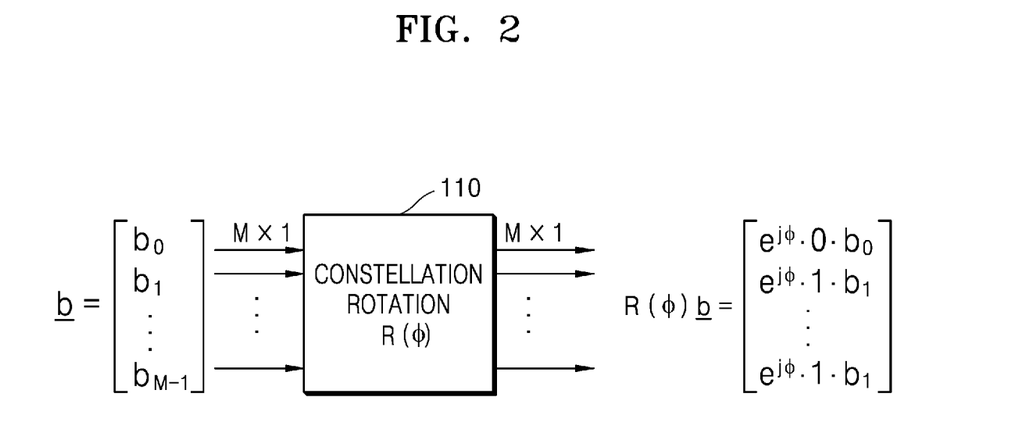
FIG. 2 is a block diagram showing in detail a constellation rotation unit of FIG. 1.
Figure 3:
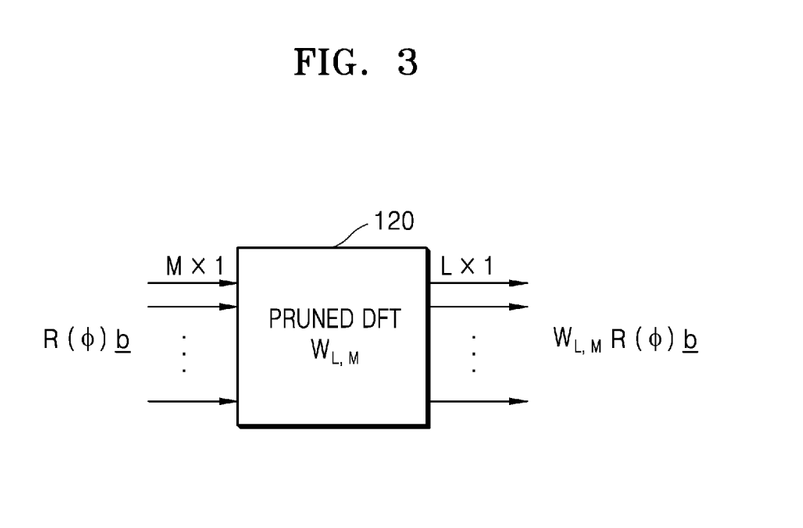
FIG. 3 is a block diagram showing in detail a pruned DFT-spread unit of FIG. 1.
Figure 4:
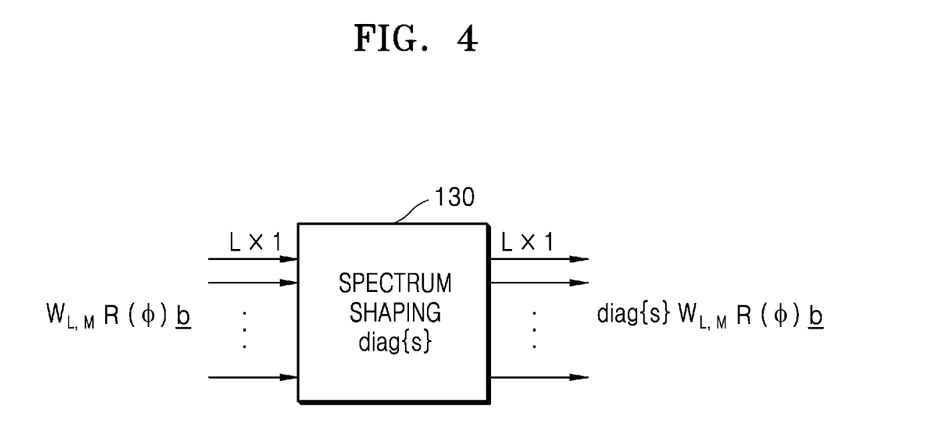
FIG. 4 is a block diagram showing in detail a frequency domain spectrum shaping unit of FIG. 1.

FIG. 1 is a block diagram showing a structure of a discrete Fourier transform (DFT)-spread orthogonal frequency division multiplexing (OFDM) transmitter according to an embodiment of the present disclosure, FIG. 2 is a block diagram showing in detail a constellation rotation unit of FIG. 1, FIG. 3 is a block diagram showing in detail a pruned DFT-spread unit of FIG. 1, and FIG. 4 is a block diagram showing in detail a frequency domain spectrum shaping unit of FIG. 1.

Referring to FIG. 1, a DFT-spread OFDM transmitter 100 according to an embodiment of the present disclosure may include a constellation rotation unit 110, a pruned DFT-spread unit 120, a frequency domain spectrum shaping unit 130, a subcarrier allocation unit 140, and a signal generation unit 150. The signal generation unit 150 may include an N-point inverse DFT (IDFT) unit 151 and a cyclic prefix (CP) insertion unit 153.

The constellation rotation unit 110 may constellation-rotate a symbol vector b including M pulse amplitude modulation (PAM) symbols by a constellation rotation angle $\phi$ to generate a constellation-rotated symbol vector d. As shown in FIG. 2, the constellation-rotated symbol vector d may be generated by $d=R(\phi)b$, and a diagonal matrix $R(\phi)$ may be defined by Equation 1.

$$R(\phi) \triangleq \text{diag}\{e^{j\phi \cdot 0}, e^{j\phi \cdot 1}, \ldots, e^{j\phi \cdot (M-1)}\} \quad \text{Equation (1)}$$

The constellation rotation angle $\phi$ may be determined based on a length M of the symbol vector b and the number L of allocated subcarriers. More specifically, the constellation rotation angle $\phi$ may be determined by Equation 2 for M being an even number, and by Equation 3 for M being an odd number.

$$\phi_{proposed} = \text{mod}\left\{\frac{(L-1)\pi}{M} + \frac{\pi}{2}, \pi\right\} \quad \text{Equation (2)}$$

$$\phi_{proposed} = \text{mod}\left\{\frac{(L-1/2)\pi}{M} + \frac{\pi}{2}, \pi\right\} \quad \text{Equation (3)}$$

In Equation 2 and Equation 3, mod{•} may be a modulo operation.

The pruned DFT-spread unit 120 may spread the constellation-rotated symbol vector d by using a pruned DFT matrix $W_{L,M}$ to generate a pruned DFT-spread vector c. As shown in FIG. 3, the pruned DFT-spread vector c may be generated by $c=W_{L,M}R(\phi)b$, and the pruned DFT matrix $W_{L,M}$ may be a matrix with an L×M size in which the last (M−L) rows are removed from an M-point DFT matrix $W_M$. An element (i, j) of the pruned DFT matrix $W_{L,M}$ may be determined by Equation 4.

$$[W_{L,M}]_{(i,j)} = \frac{1}{\sqrt{M}} e^{-j\frac{2\pi}{M}(i-1)(j-1)} \quad \text{Equation (4)}$$

In Equation 4, indices i and j respectively satisfy 1≤i≤L, and 1≤j≤M.

The frequency domain spectrum shaping unit 130 may Hadamard-multiply (perform a Hadamard product) the pruned DFT-spread vector c with the shaping vector s to generate a frequency domain spectrum shaped vector a. Alternatively, as shown in FIG. 4, the frequency domain spectrum shaped vector a may be generated by multiplying a matrix diag{s} having the shaping vector s as a diagonal element to the pruned DFT-spread vector c. A shaping vector s with an L×1 size may be defined by Equation 5.

$$s=[s_0, s_1, \ldots, s_{L-1}] \quad \text{Equation (5)}$$

Each element of the shaping vector s may be determined based on the length M of the symbol vector b and the number L of allocated subcarriers. More specifically, an Ith element of the shaping vector s may be determined by Equation 6 for M being an even number, and by Equation 7 for M being an odd number.

$$s_{proposed,l} \triangleq \begin{cases} \sqrt{2}\sin\left(\frac{\pi\left(l+\frac{1}{2}\right)}{2L-M}\right), & \text{for } 0 \leq l \leq L - \frac{M}{2} - 1, \\ \sqrt{2}\cos\left(\frac{\pi\left(l-\frac{M}{2}+\frac{1}{2}\right)}{2L-M}\right), & \text{for } \frac{M}{2} \leq l \leq L-1, \\ \sqrt{2}, & \text{elsewhere} \end{cases} \quad \text{Equation (6)}$$

-continued $$S_{proposed,l} \triangleq \begin{cases} \sqrt{2} \sin\left(\dfrac{\pi\left(l+\dfrac{1}{4}\right)}{2L-M}\right), & \text{for } 0 \le l \le L - \dfrac{M+1}{2}, \\ \sqrt{2} \cos\left(\dfrac{\pi\left(l-\dfrac{M}{2}+\dfrac{1}{4}\right)}{2L-M}\right), & \text{for } \dfrac{M+1}{2} \le l \le L-1, \\ \sqrt{2}, & \text{elsewhere} \end{cases}$$

Equation (7)

In Equation 6 and Equation 7, l=0, 1, 2, . . . , L−1 and M/2≤L≤M may be satisfied.

The subcarrier allocation unit 140 may allocate the frequency domain spectrum shaped vector a to a subcarrier in an allocated frequency range. When the frequency domain spectrum shaped vector a is allocated to the subcarrier, it passes through the N-point IDFT unit 151 and the CP insertion unit 153 to generate a DFT-spread OFDM signal x. Operations of the N-point IDFT unit 151 and the CP insertion unit 153 are widely known to the technical field to which the present disclosure belongs, and thus will not be described herein.

Figure 5:
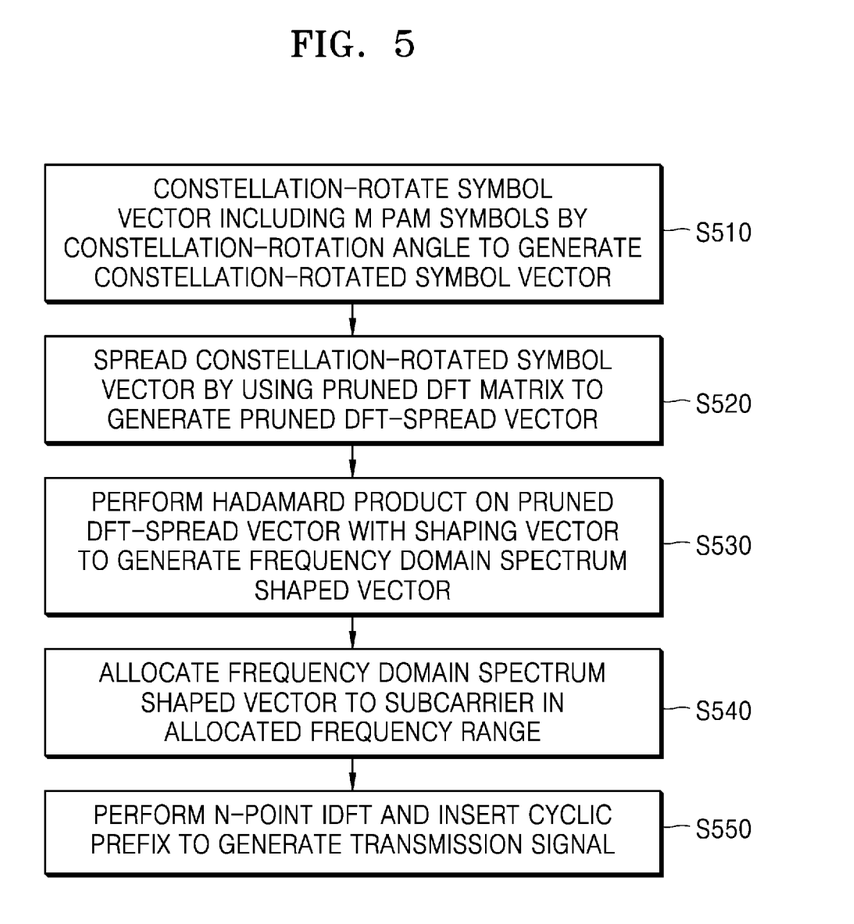
FIG. 5 is a flowchart of a DFT-spread OFDM transmission method, according to an embodiment of the present disclosure.

FIG. 5 is a flowchart of a DFT-spread OFDM transmission method, according to an embodiment of the present disclosure.

The DFT-spread OFDM transmission method according to an embodiment of the present disclosure may be performed by the DFT-spread OFDM transmitter 100 of FIG. 1.

Referring to FIG. 5, in operation S510, a symbol vector b including M PAM symbols may be constellation-rotated by a constellation rotation angle ϕ to generate a constellation-rotated symbol vector d. The constellation rotation angle ϕ may be determined by Equation 2 for M being an even number, and by Equation 3 for M being an odd number.

In operation S520, the constellation-rotated symbol vector d may be spread by using a pruned DFT matrix $W_{L,M}$ to generate a pruned DFT-spread vector c. An element (i, j) of the pruned DFT matrix $W_{L,M}$ may be determined by Equation 4.

In operation S530, the pruned DFT-spread vector c may be Hadamard-multiplied with the shaping vector s to generate a frequency domain spectrum shaped vector a. An lth element of the shaping vector s may be determined by Equation 6 for M being an even number, and by Equation 7 for M being an odd number.

In operation S540, the frequency domain spectrum shaped vector a may be allocated to a subcarrier in an allocated frequency range.

In operation S550, when the frequency domain spectrum shaped vector a is allocated to the subcarrier, N-point IDFT may be performed and a CP may be inserted to generate a signal.

Figure 6:
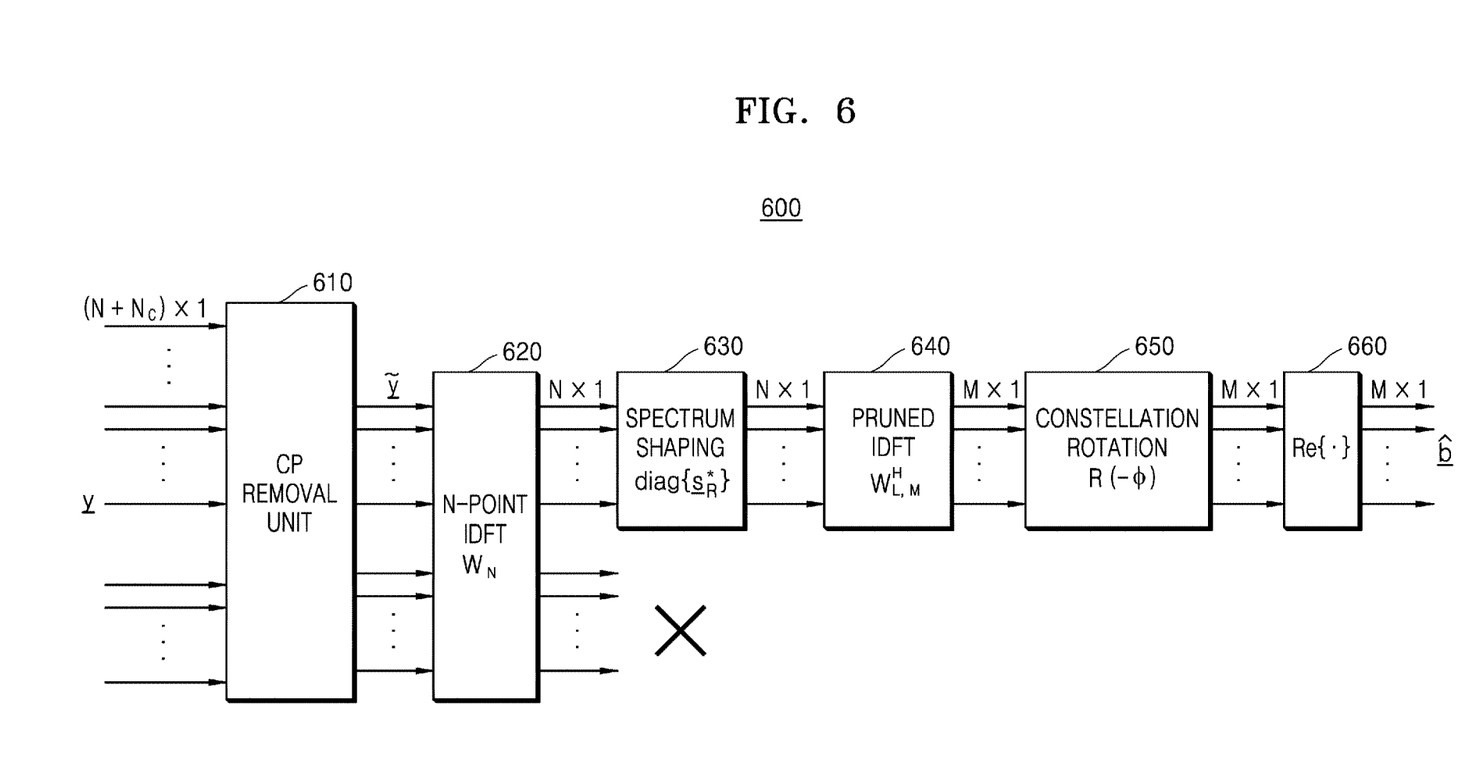
FIG. 6 is a block diagram showing a structure of a DFT-spread OFDM receiver, according to an embodiment of the present disclosure.

FIG. 6 is a block diagram showing a structure of a DFT-spread OFDM receiver, according to an embodiment of the present disclosure.

Referring to FIG. 6, a DFT-spread OFDM receiver 600 according to an embodiment of the present disclosure may include a CP removal unit 610, an N-point DFT unit 620, a frequency domain reception spectrum shaping unit 630, a pruned IDFT unit 640, an inverse constellation rotation unit 650, and an estimation unit 660.

The CP removal unit 610 may receive a signal passing through a channel and remove a CP from the signal y to generate a CP-removed vector ỹ.

The N-point DFT unit 620 may perform N-point DFT on the CP-removed vector ỹ and cut out a part corresponding to the subcarrier in the allocated frequency range from a result to generate a vector ã. Although it is shown in FIG. 6 that the vector ã resulting from cutout of the part corresponding to the subcarrier in the allocated frequency range corresponds to first L subcarriers, the present disclosure is not limited thereto. Hereinbelow, assuming allocation to the first L subcarriers, the vector ã may be defined by Equation 8.

$$\tilde{a} \triangleq [I_L O_{L \times (N-L)}] W_N \tilde{y}$$  Equation (8)

Herein, $I_L$ may be an L×L unit matrix and $O_{L \times (N-L)}$ may be an L×(N −L) zero matrix.

The frequency domain reception spectrum shaping unit 630 may the vector ã resulting from cutout of the part corresponding to the subcarrier in the allocated frequency range by a conjugate complex vector of the reception shaping vector $s_R$ to generate a frequency domain reception spectrum shaped vector.

The pruned IDFT unit 640 may multiply a prefixed pruned DFT matrix $W_{L,M}^H$ to the frequency domain reception spectrum shaped vector to generate a despread vector.

The inverse constellation rotation unit 650 may inversely constellation-rotate the despread vector by an inverse constellation rotation angle −ϕ to generate the inversely constellation-rotated vector.

The estimation unit 660 may take a real number part of the inversely constellation-rotated vector to generate an estimated value $\widehat{\tilde{b}}$ of a transmitted PAM symbol vector. Thus, the estimated value $\widehat{\tilde{b}}$ of the PAM symbol vector may be expressed as Equation 9.

$$\hat{b} = \mathrm{Re}[R(-\phi) W_{L,M}^H \, \mathrm{diag}\{s_R^*\} \tilde{a}]$$  Equation (9)

Herein, $s_R$ may be an L x 1 reception shaping vector, an upper subscript * may mean conversion to a conjugate complex vector, and the inverse constellation rotation angle −ϕ may be a negative number of a transmission rotation angle.

The estimated value $\widehat{\tilde{b}}$ of the PAM symbol vector may be expressed as Equation 10 by using an L x 1 frequency domain channel diagonal matrix $\widehat{\tilde{b}}$.

$$\hat{b} = \mathrm{Re}\{R(-\phi) W_{L,M}^H \, \mathrm{diag}\{s_R^*\} \tilde{H} \mathrm{diag}\{s\} W_{L,M} R(\phi)\} b + \text{noise}$$  Equation (10)

Herein, the frequency domain channel diagonal matrix H̃ may be expressed as Equation 11 by using an N×N channel diagonal matrix H.

$$\tilde{H} = [I_L O_{L \times (N-L)}] W_N H W_N^H [I_L O_{L \times N-L)}]^H$$  Equation (11)

Meanwhile, when a channel is a frequency-flat, the reception shaping vector $s_R$ may be selected identically to a transmission shaping vector.

Figure 7:
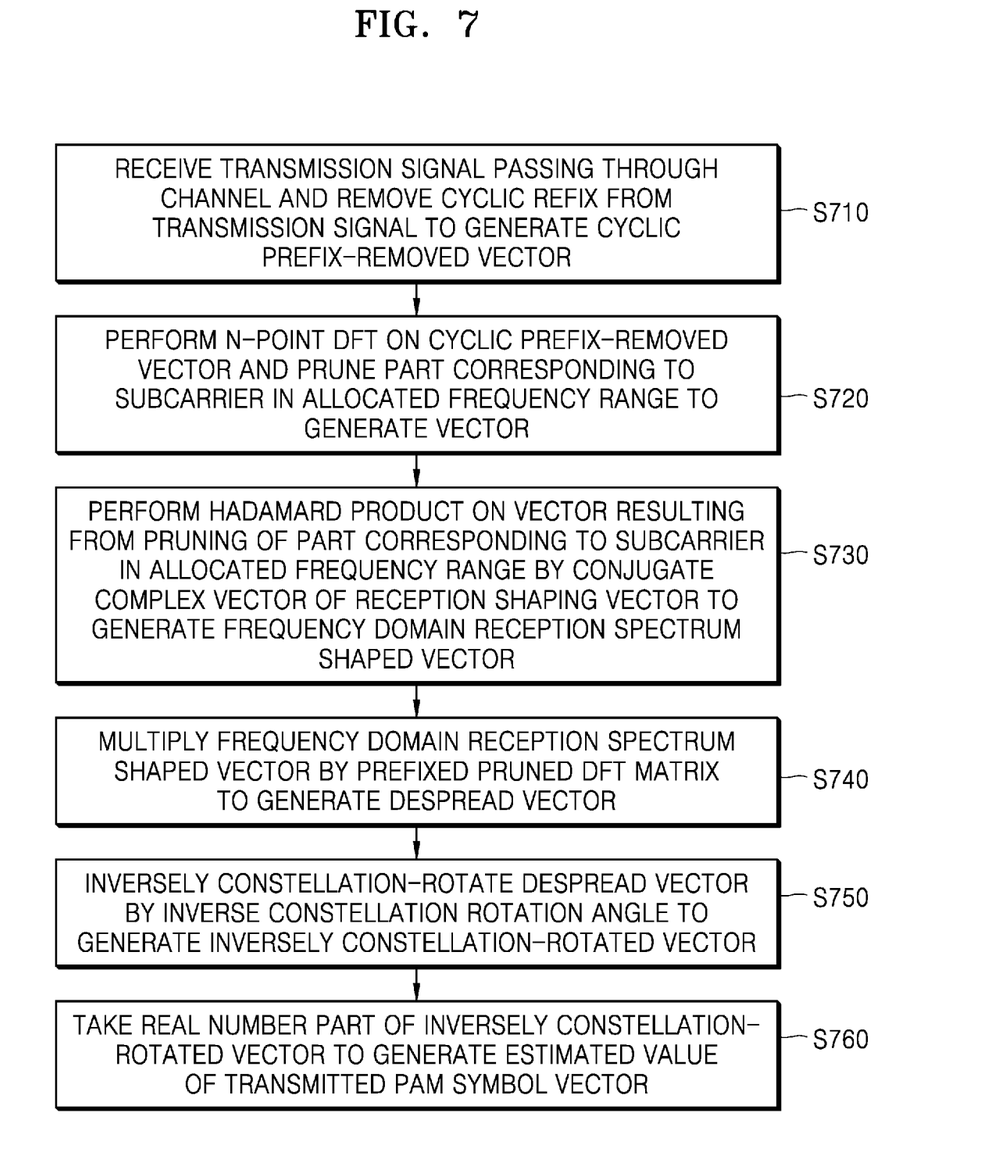
FIG. 7 is a flowchart of a DFT-spread OFDM reception method, according to an embodiment of the present disclosure.

FIG. 7 is a flowchart of a DFT-spread OFDM reception method, according to an embodiment of the present disclosure.

The DFT-spread OFDM reception method according to an embodiment of the present disclosure may be performed by the DFT-spread OFDM receiver 600 of FIG. 6.

Referring to FIG. 7, in operation S710, a signal y passing through a channel may be received and a CP may be removed from the signal y to generate a CP-removed vector ỹ.

In operation S720, N-point DFT may be performed on the CP-removed vector ỹ and a part corresponding to the subcarrier in the allocated frequency range may be pruned from a result to generate a vector ã. Assuming allocation to the first L subcarriers, the vector ã may be defined by Equation 8.

In operation S730, the vector ã resulting from cutout of the part corresponding to the subcarrier in the allocated frequency range may be Hadamard-multiplied by a conjugate complex vector of the reception shaping vector $s_R$ to generate a frequency domain reception spectrum shaped vector.

When the channel is frequency-flat, the reception shaping vector $s_R$ may be selected identically to the transmission shaping vector.

In operation S740, a prefixed pruned DFT matrix $W_{L,M}^H$ may be multiplied to the frequency domain reception spectrum shaped vector to generate a despread vector.

In operation S750, the despread vector may be inversely constellation-rotated by an inverse constellation rotation angle $-\phi$ to generate the inversely constellation-rotated vector.

In operation S760, a real number part of the inversely constellation-rotated vector may be taken to generate an estimated value $\widehat{b}$ of a transmitted PAM symbol vector. The estimated value $\widehat{b}$ of the PAM symbol vector may be expressed as Equation 9.

Figure 8:
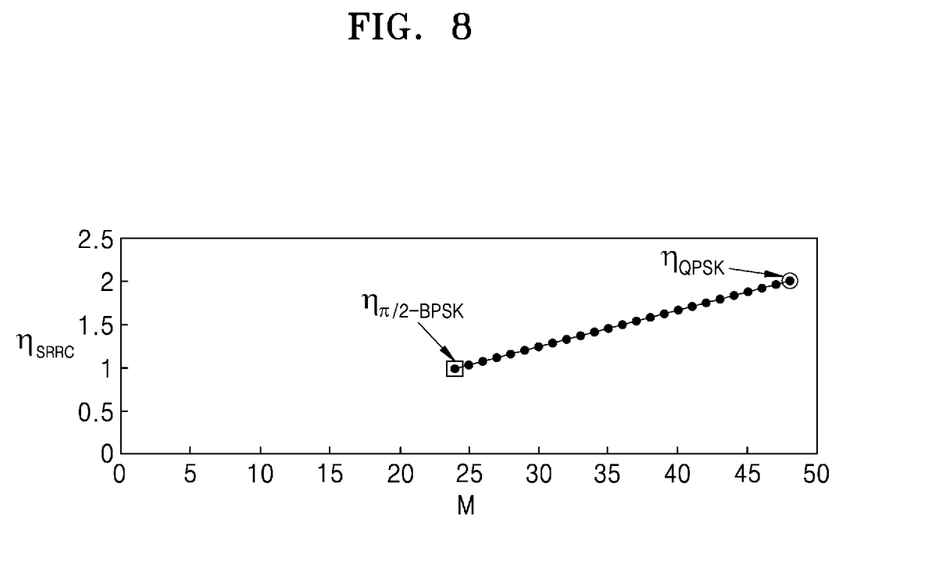
FIG. 8 is a graph showing frequency efficiency with respect to the number of binary phase shift keying (BPSK) symbols transmitted in fixed subcarriers.

FIG. 8 is a graph showing frequency efficiency with respect to the number of BPSK symbols transmitted in fixed subcarriers.

FIG. 8 shows frequency efficiency when a length of a constellation-rotated BPSK symbol vector, M, changes from 24 to 28 in case of allocation of L=24 subcarriers. Referring to FIG. 8, for M=24, a constellation rotation angle and a shaping vector according to embodiments of the present disclosure may have the same frequency efficiency as when spectrum shaping is not performed, and may improve the frequency efficiency up to twice when spectrum shaping is not performed, for M being increased to 48.

Figure 9:
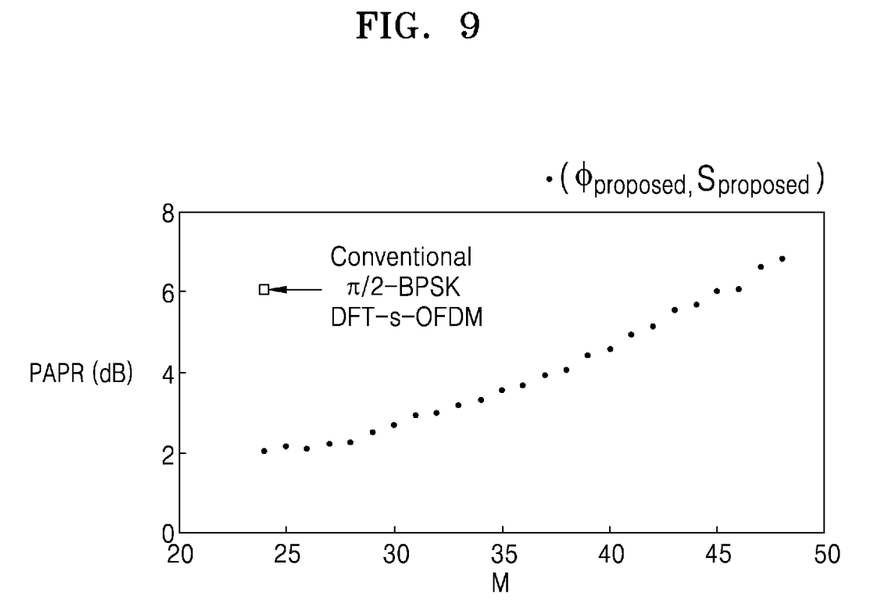
FIG. 9 is a graph showing peak-to-average power ratio (PAPR) performance with respect to the number of BPSK symbols transmitted in fixed subcarriers.

FIG. 9 is a graph showing PAPR performance with respect to the number of BPSK symbols transmitted in fixed subcarriers.

FIG. 9 shows a PAPR value when a length of a constellation-rotated BPSK symbol vector, M, changes from 24 to 28 in case of allocation of L=24 subcarriers. Referring to FIG. 9, for M=24, a constellation rotation angle and a shaping vector according to embodiments of the present disclosure may have a much lower PAPR performance than when spectrum shaping is not performed, and in particular, for 24<M≤44, the constellation rotation angle and the shaping vector according to embodiments of the present disclosure may have a better frequency efficiency while having a low PAPR performance than when spectrum shaping is not performed. A case with 44<M≤48 may have a PAPR performance that is similar to or higher than that of a conventional pi/2-BPSK symbol, but may have a higher frequency efficiency. Thus, by using the constellation rotation angle and the shaping vector according to embodiments of the present disclosure, the PAPR performance and the frequency efficiency may be easily traded off with each other.

Although it has been described with reference to the drawings and embodiments above, it does not mean that the scope of protection of the present disclosure is limited by the drawings or the embodiments, and those of ordinary skill in the art may understand that various modifications and changes may be made to the present disclosure without departing from the spirit and the scope of the present disclosure described in the claims.

DESCRIPTION OF REFERENCE NUMERALS

100: DFT-SPREAD OFDM TRANSMITTER
110: CONSTELLATION ROTATION UNIT
120: PRUNED DFT-SPREAD UNIT
130: FREQUENCY DOMAIN SPECTRUM SHAPING UNIT
140: SUBCARRIER ALLOCATION UNIT
150: SIGNAL GENERATION UNIT
151: N-POINT IDFT UNIT
153: CYCLIC PREFIX INSERTION UNIT
600: DFT-SPREAD OFDM RECEIVER
610: CYCLIC PREFIX REMOVAL UNIT
620: N-POINT DFT UNIT
630: FREQUENCY DOMAIN RECEPTION SPECTRUM SHAPING UNIT
640: PRUNED IDFT UNIT
650: INVERSE CONSTELLATION ROTATION UNIT
660: ESTIMATION UNIT

The invention claimed is:

1. A discrete Fourier transform (DFT)-spread orthogonal frequency division multiplexing (OFDM) transmission method performed by a DFT-spread OFDM transmitter, the DFT-spread OFDM transmission method comprising:
constellation-rotating a symbol vector b comprising M pulse amplitude modulation (PAM) symbols by a constellation rotation angle $\phi$ to generate a constellation-rotated symbol vector d;
spreading the constellation-rotated symbol vector d with a size of M*1 by using a pruned DFT matrix $W_{L,M}$ to generate a pruned DFT-spread vector c;
performing a Hadamard product on the pruned DFT-spread vector c with a shaping vector s to generate a frequency domain spectrum shaped vector a, wherein the L is a number of subcarriers to be used in an allocated frequency range and the L is less than the M; and
allocating the frequency domain spectrum shaped vector a to the subcarrier,
wherein the shaping vector s is determined based on the M and the L, and
wherein in case that the M is an odd number, the constellation rotation angle $\phi$ is determined by $$\phi = \mathrm{mod}\left\{\frac{\left(L - \frac{1}{2}\right)\pi}{M} + \frac{\pi}{2}, \pi\right\},$$

and l-the element of the shaping vector s, $S_l$, is determined by $$S_l \triangleq \begin{cases} \sqrt{2}\sin\left(\frac{\pi\left(i + \frac{1}{4}\right)}{2L - M}\right), & \text{for } 0 \leq l < L - \frac{M-1}{2} \\ \sqrt{2}\cos\left(\frac{\pi\left(l - \frac{M}{2} + \frac{1}{4}\right)}{2L - M}\right), & \text{for } \frac{M+1}{2} \leq l \leq L - 1 \\ \sqrt{2}, & \text{elsewhere} \end{cases},$$

where l=0, 1, 2, ..., L−1 and M/2≤L≤M/2.

2. The method of claim 1, wherein when the M is an even number, the constellation rotation angle φ is determined by $$\phi = \mathrm{mod}\left\{\frac{\left(L-\frac{1}{2}\right)\pi}{M} + \frac{\pi}{2}, \pi\right\},$$

where L is a number of subcarriers to be used.

3. The method of claim 1, wherein an element (i, j) of the pruned DFT matrix $W_{L,M}$, $[W_{L,M}]_{(i,j)}$, is determined by $$[W_{L,M}]_{(i,j)} = \frac{1}{\sqrt{M}} e^{-j\frac{2\pi}{M}(i-1)(j-1)},$$

where indices i and j respectively satisfy $1 \leq i \leq L$ and $1 \leq j \leq L$.

4. The method of claim 1, wherein when M is an even number, an I-th element of the shaping vector s, $S_l$, is determined by $$S_l \triangleq \begin{cases} \sqrt{2}\sin\left(\frac{\pi\left(l+\frac{1}{2}\right)}{2L-M}\right), & \text{for } 0 \leq l \leq L - \frac{M}{2} - 1 \\ \sqrt{2}\cos\left(\frac{\pi\left(l-\frac{M}{2}+\frac{1}{2}\right)}{2L-M}\right), & \text{for } \frac{M}{2} \leq l \leq L - 1 \\ \sqrt{2}, & \text{elsewhere} \end{cases},$$

where l=0, 1, 2, . . . , L−1 and M/2≤L≤M.

5. The method of claim 1, further comprising:
performing N-point inverse DFT (IDFT) on the allocated frequency domain spectrum shaped vector a and inserting a cyclic prefix (CP) to generate a signal x.

6. A discrete Fourier transform (DFT)-spread orthogonal frequency division multiplexing (OFDM) reception method performed by a DFT-spread OFDM receiver, the method comprising:
receiving a signal y passing through a channel,
removing a cyclic prefix (CP) from the signal y to generate a CP-removed vector ỹ;
performing N-point DFT on the CP-removed vector ỹ and cutting out a part corresponding to a subcarrier in an allocated frequency range to generate a vector ã with a size of L*1, wherein the L is a number of subcarriers to be used in an allocated frequency range;
performing a Hadamard product on the vector ã resulting from cutout of the part corresponding to the subcarrier in the allocated frequency range with a conjugate complex vector of a reception shaping vector $s_R$ to generate a frequency domain reception spectrum shaped vector;
multiplying the frequency domain reception spectrum shaped vector by a prefixed pruned DFT matrix $W_{L,M}^H$ to generate a despread vector with a size of M*1, wherein the M is a number of PAM symbol to be restored by the receiver and the L is less than the M;
inversely constellation-rotating the despread vector by an inverse constellation rotation angle −φ to generate an inversely constellation-rotated vector; and
taking a real number part of the inversely constellation-rotated vector to generate an estimated value $\widehat{b}$ of a transmitted pulse amplitude modulation (PAM) symbol vector,
wherein the reception shaping vector $s_R$ is determined based on the M and the L, and
wherein in case that the M is an odd number, the inverse constellation rotation angle −φ is determined by $$\phi = \mathrm{mod}\left\{\frac{\left(L-\frac{1}{2}\right)\pi}{M} + \frac{\pi}{2}, \pi\right\},$$

and 1-the element of the reception shaping vector $s_R$, $S_{R,l}$, is determined by $$s_{R,l} \triangleq \begin{cases} \sqrt{2}\sin\left(\frac{\pi\left(l+\frac{1}{4}\right)}{2L-M}\right), & \text{for } 0 \leq l \leq L - \frac{M+1}{2} \\ \sqrt{2}\cos\left(\frac{\pi\left(l-\frac{M}{2}+\frac{1}{4}\right)}{2L-M}\right), & \text{for } \frac{M+1}{2} \leq l \leq L - 1, \\ \sqrt{2}, & \text{elsewhere} \end{cases}$$

where l=0, 1, 2, . . . , L−1 and M/2≤L≤M/2.

7. The method of claim 6, wherein the reception shaping vector is same as a transmission shaping vector.

* * * * *